United States Patent [19]

Hayashi et al.

[11] Patent Number: 4,981,039

[45] Date of Patent: Jan. 1, 1991

[54] LIQUID LEVEL GAUGE

[75] Inventors: Chikahisa Hayashi, Anjo; Makoto Kawai, Nagoya; Toshinori Takahashi, Bisai; Mitsuhiro Kikuta, Nagoya, all of Japan

[73] Assignee: Toyoda Gosei Co., Ltd., Nishikasugai, Japan

[21] Appl. No.: 375,671

[22] Filed: Jul. 5, 1989

[30] Foreign Application Priority Data

Jul. 7, 1988 [JP] Japan ................................. 63-170290
Oct. 26, 1988 [JP] Japan ................................. 63-271803

[51] Int. Cl.$^5$ .................... H01H 35/18; G01N 27/06; G01K 7/16
[52] U.S. Cl. ..................................... 73/292; 337/207; 340/449; 340/450; 374/142
[58] Field of Search .................. 73/292, 308; 374/142, 374/165; 340/623, 449, 450; 200/84 C; 337/207

[56] References Cited

U.S. PATENT DOCUMENTS

| | | | |
|---|---|---|---|
| 1,301,910 | 4/1919 | Collins | 73/292 |
| 4,165,935 | 8/1979 | Bongort et al. | 200/84 C X |
| 4,254,375 | 3/1981 | Matsuoka | 374/142 |
| 4,356,729 | 11/1982 | Kubota et al. | 73/308 |
| 4,442,405 | 4/1984 | Andrejasich | 73/308 X |
| 4,560,973 | 12/1985 | Grimm et al. | 374/165 X |
| 4,720,997 | 1/1988 | Doak et al. | 73/295 |
| 4,748,300 | 5/1988 | Anderson | 200/84 C |

Primary Examiner—Daniel M. Yasich
Attorney, Agent, or Firm—Cushman, Darby & Cushman

[57] ABSTRACT

A gauge for detecting both the temperature and surface level of a fluid within a container. The gauge includes an elongated casing which extends into the fluid. A float which rises and falls with the fluid surface is slidably coupled to the casing and carries a magnet. A support member positioned within the casing carries both a sensor for determining the position of the magnet and a sensor for measuring the fluid temperature. The surface level of the fluid can be determined from the position of the magnet. A heat conducting element thermally couples the temperature detecting sensor to the fluid. In a preferred embodiment, the support member takes the form of a printed board. In a separate preferred aspect, the temperature and magnet detecting sensors are reed switches which are vertically spaced apart yet aligned in parallel to minimize interference.

20 Claims, 6 Drawing Sheets

FIG. 3
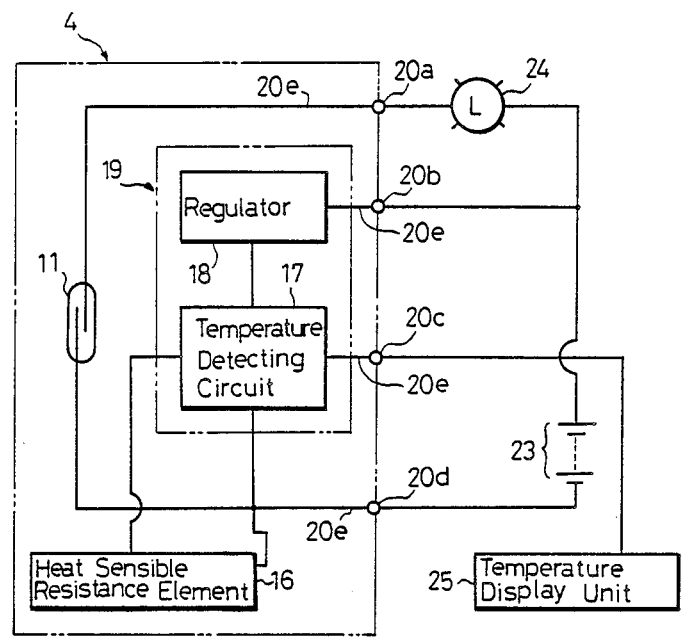
FIG. 4    FIG. 5
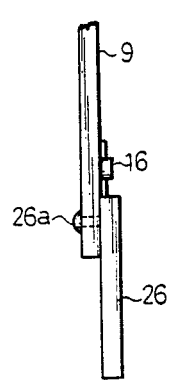 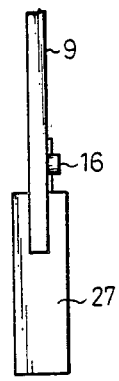

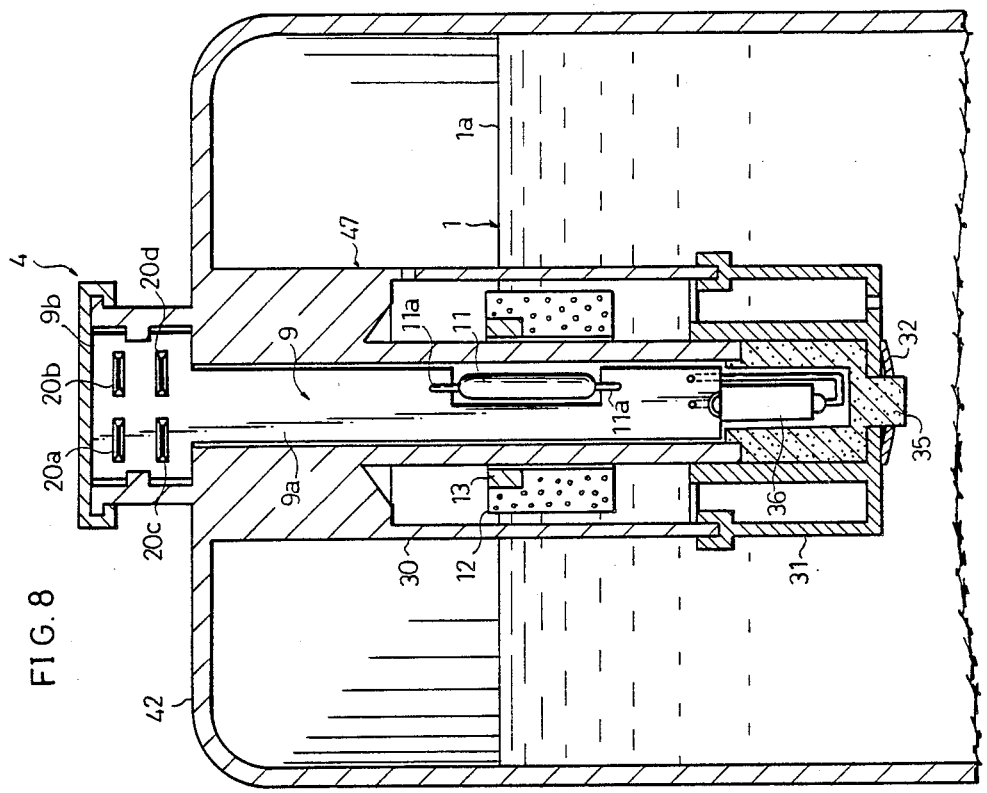
FIG. 8
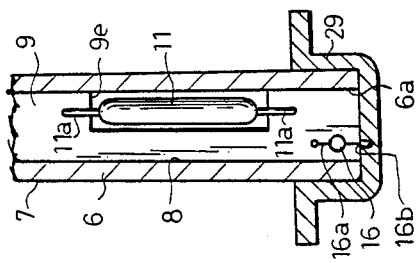
FIG. 7
FIG. 6

LIQUID LEVEL GAUGE

FIELD OF THE INVENTION

The present invention relates generally to a liquid level gauge for detecting changes in the surface level of a liquid stored within a container.

DESCRIPTION OF THE RELATED ART

In many applications, liquid level gauges are used to measure the level of operating fluids within a tank or reservoir. Prior art liquid level gauges often have a casing mounted to the walls of the tank such that the gauge extends into the operating fluid. In many applications, it is also desirable to detect the temperature of the operating fluid while detecting changes in the liquid surface level. In such cases, a liquid thermometer is typically attached to the tank beside the liquid level gauge.

One drawback of such an arrangement is that the separately formed liquid level gauge and temperature detecting apparatus each require a separate casing. Further, many of the required detector components, such as printed circuit boards, have to be duplicated and mounted within the separate casings. This effectively requires duplication of assembly procedures and requires the use of two mounting arrangements on the tank. In many applications, such as automotive power steering fluid reservoirs, such duplicative mounting arrangements can complicate the shape of the tank. It also complicates the assembly and inspection procedures when compared to reservoirs having only a single sensing device.

SUMMARY OF THE INVENTION

An object of the present invention is to provide a compact liquid level gauge having functions of detecting both the changes of liquid surface level and the temperature of the fluid.

Another object of the present invention is to provide a liquid level gauge of which the endurance is improved by protecting temperature detecting elements from the fluid.

Another object of the present invention is to provide a liquid level gauge which requires a lesser number of elements.

Another object of the present invention is to provide a liquid level gauge which reduces the assembling time.

Another object of the present invention is to provide a liquid level gauge which makes the assembling and inspection procedures of a container easier by means of simplifying the shape of the container.

Another object of the present invention is to provide a liquid level gauge which can detect liquid surface level even when a float is positioned below a magnetic detecting element.

To achieve the foregoing and other objects of the invention, a gauge is disclosed for measuring both the temperature and surface level of a fluid within a container. The gauge includes an elongated casing that penetrates the fluid surface. A float which carries a magnet is slidably coupled to the casing such that it rises and falls with the fluid surface. A support member positioned within the casing carries both means for detecting the fluid temperature and means for detecting the magnet position. A heat conductor thermally couples the temperature detecting means to the fluid.

In a preferred embodiment, the support member takes the form of a printed board. In a distinct preferred embodiment of the invention, the temperature and magnet position detectors take the form of reed switches which are spaced apart vertically and aligned in parallel to reduce interference.

BRIEF DESCRIPTION OF THE DRAWINGS

FIGS. 1 to 3 show the first embodiment of the present invention,

FIG. 1 is a partial broken front view showing the state of a liquid level gauge mounted to a reservoir tank, FIG. 2 is a front view of a printed board, FIG. 3 is a block circuit diagram showing an electronic diagram of the liquid level gauge, FIGS. 4 to 8 show a different version of the first embodiment of the present invention, FIGS. 4 and 5 are partial broken side views showing the structure of a tip portion of a printed board, FIGS. 6 and 7 are partial broken front view showing the structure of a tip portion of the liquid level gauge, FIG. 8 is a partial broken front view showing the state of the liquid level gauge mounted to a reservoir tank, FIG. 9 is a vertical sectional view of a reservoir tank to which a liquid level gauge is mounted, FIG. 10 is a block circuit diagram showing an electronic diagram of the liquid level gauge, FIG. 11 is a vertical sectional view of a liquid gauge, FIG. 12 is a block circuit diagram.

DESCRIPTION OF THE PREFERRED EMBODIMENTS

[First Embodiment]

The first embodiment of the present invention is a liquid level gauge which is mounted to a reservoir tank for power steering fluid of an automobile, and which is now described in detail hereinafter referring to FIGS. 1 to 3.

Figure 1:
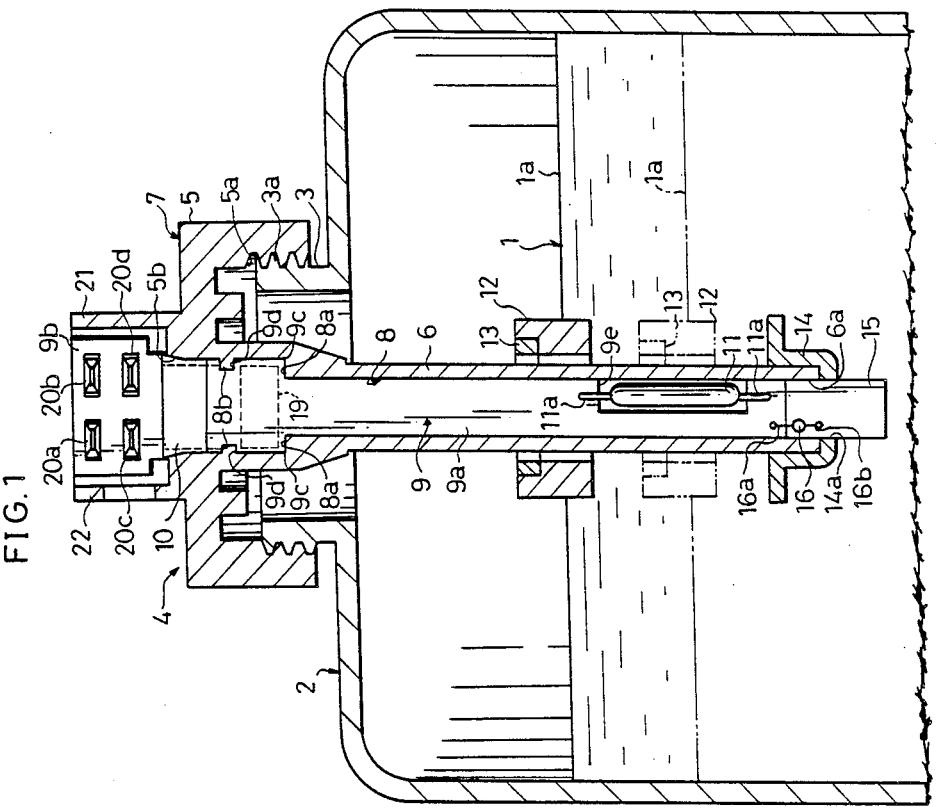

As shown in FIG. 1, a cylindrical gauge mounting portion 3 protruding upwardly is formed on an upper side wall of a reservoir tank 2 which holds power steering fluid 1 inside, and an upper end of the gauge mounting portion 3 is opened. An external thread 3a is formed on an outer periphery of the gauge mounting portion 3.

In this embodiment, a liquid level gauge 4 is attached to the gauge mounting portion 3, and comprises a casing 7 which has a lid portion 5 including an internal thread 5a to be engaged with the external thread 3a, and a cylindrical portion 6 extending downwardly from the center of lower side of the lid portion 5 and dipped in the fluid 1 in the reservoir tank 2. On the casing 7 is formed a mounting hole 8 extending through from a top surface of the lid portion 5 to a bottom surface of the cylindrical portion 6, and both the top surface of the lid portion 5 and the bottom surface of the cylindrical portion 6 respectively have an opening 5b, 6a. A stage portion 8a and an engaging projection 8b are formed on an upper inside wall of the mounting hole 8.

Figure 2:
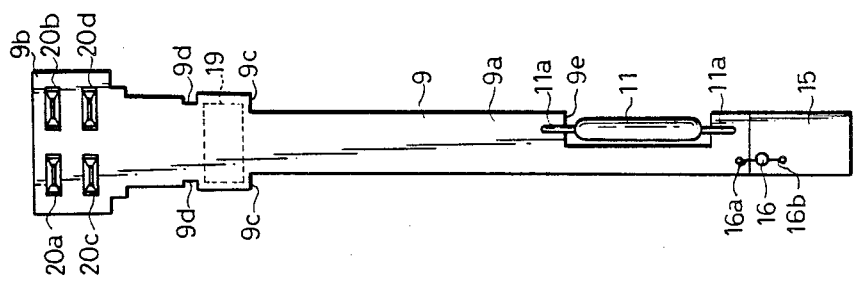

As shown in FIGS. 1 and 2, in the mounting hole 8 is positioned a printed board 9 made of glass epoxy having small water absorptivity. The printed board 9 comprises a detecting portion 9a inserted into the mounting hole 8 to detect the changes of surface level 1a of the fluid 1, and a connecting portion 9b which is integrally formed on an upper portion of the detecting portion 9a and which protrudes upwardly from the opening 5b of the lid portion 5. A rubber cap 10 is rigidly attached to a top end of the detecting portion 9a and is fitted to the opening 5b of the lid portion 5. A bottom end of the detecting portion 9a projects downwardly from and through the cylindrical portion 6.

The upper portion of printed board 9 has an enlarged portion 9c. The enlarged portion 9c is arranged to engage an indent 8a in the mounting hole 8. The enlarged portion 9c is sized such that its peripheral surfaces 9d engage projections 8b which form the sides of indent 8a. The indent is positioned directly below the rubber cap 10.

A notch 9e extending longitudinally is formed on one side periphery of a lower portion of the detecting portion 9a of the printed board 9. In the notch 9e is positioned a reed switch 11 as a magnetic detecting element having normally open contact point. Tip portions of terminals 11a positioned on both upper and lower ends of the reed switch 11 are bent, and the bent portions go through the printed board 9 at the portions near both upper and lower ends of the notch 9e, and are attached to the surface of opposite side or the rear surface of the printed board 9 by soldering. The reed switch 11 is for detecting the changes of the surface level 1a of the fluid 1.

A float 12 of ring shape is movably fitted to the outer surface of the cylindrical portion 6, and moves vertically in accordance with the vertical changes of the fluid surface level 1a. A magnet 13 is mounted to an upper inner circumference of the float 12 to energize the reed switch 11. As the surface level 1a of the fluid 1 goes down from a position shown by a continuous line of FIG. 1 to another position shown by a two-dashed chain line of FIG. 1, the float 12 goes down following the surface level 1a and the magnet 13 comes to face the reed switch 11 to energize the reed switch 11.

To the lower end of the cylindrical portion 6 is fixed a float stopper 14 to prevent the float 12 from falling off from the cylindrical portion 6 and to keep the reed switch 11 in operating condition by restricting further downward movement of the magnet 13 from a predetermined position. A through hole 14a is formed on a bottom wall of the float stopper 14, and has a size which allows the printed board 9 to go through while communicating with the mounting hole 8 of the casing 7.

Below the notch 9e of the printed board 9, a heat conducting member 15 is formed at the lower end of the detecting portion 9 by extending downward a conductive foil formed on the rear surface of the printed board 9 and made of copper of high heat conductivity. A lower end of the heat conducting member 15 projects downward from the cylindrical portion 6, namely, the casing 7 via the opening 6a of the cylindrical portion 6 and via the through hole 14a of the float stopper 14 to dip in the fluid 1. On an upper end portion of the heat conducting member 15 at the inner side of the cylindrical portion 6, namely, in the mounting hole 8 is provided a heat sensitive resistance element 16 as a temperature sensor for detecting the temperature of the fluid 1. A part of the heat sensitive resistance element 16 is connected to the heat conducting member 15, and the heat of the fluid 1 transfers to the heat sensitive resistance element 16 via the heat conducting member 15. An output terminal 16a of the heat sensitive resistance element 16 goes through the printed board 9, is soldered the rear surface of the printed board 9, and connected with a circuit portion 19 provided on the upper portion of the detecting portion 9a and comprising a conventional temperature detecting circuit 17, a regulator 18, etc. via a printed wiring 12 of a conductive foil formed on the rear surface of the printed board 9 as shown in FIG. 3. A terminal 16b is soldered the rear surface and connected with a connector connecting terminal 21d via a printed wiring 20e of a conductive foil which is formed on the rear surface.

Four pieces of connector connecting terminals 20a, 20b, 20c, 20d are projectingly provided on the connecting portion 9b of the printed board 9. Each connecting terminal 20a to 20d is electrically connected with the circuit portion 19 and with both the upper and lower terminals 11a of the reed switch 11 via the printed wiring 20e of the printed board 9.

While the printed board 9 is attached to the casing 7 as described above, epoxy resin (not shown) is filled in a space of the mounting hole 8 of the casing 7. The filling of the epoxy resin seals especially the opening 6a at the lower end of the cylindrical portion 6 and prevents the fluid 1 from coming into the mounting hole 8.

A pair of connector guides 21 and 22 are formed facing each other at both sides of the opening 5b on the upper surface of the lid portion 5. A connector casing (not shown) having the other connecting terminals corresponding to each connecting terminal 20a to 20d is fitted between the connector guides 21 and 22 in order to connect such lines as an electric power supply line and a signal output line with each connector connecting terminal 20a to 20d.

An electrical structure of the liquid level gauge 4 is described hereinafter referring to FIG. 3.

Both ends of the reed switch 11 constituting the liquid level gauge 4 are respectively connected with the connector connecting terminals 20a and 20d. In this embodiment, a negative electrode of a battery 23 is connected with one connector connecting terminal 20d and a positive electrode of the battery 23 is connected with another connector connecting terminal 20a via an indicating light 24 provided at a driver's console. Accordingly, the indicating light 24 turns on when the reed switch 11 is energized. One end of an electric power supply terminal of the temperature detecting circuit 17 consisituting the circuit portion 19 is connected with the connector connecting terminal 20b via the regulator 18 used for adjusting voltage, the other end of the electric power supply terminal of the same circuit 17 is connected with the connector connecting terminal 20d. The positive electrode of the battery 23 is connected to the connector connecting terminal 20b.

The heat sensitive resistance element 16 is connected with a signal input side of the temperature detecting circuit 17, and detecting signals of the element 16 are input thereinto. An output side of the temperature detecting circuit 17 is connected with the connector connecting terminal 20c. A temperature display unit 25 provided at the driver's console is connected with the connector connecting terminal 20c. Accordingly, the detecting signals from the heat sensitive resistance element 16 are input into the temperature detecting circuit 17, and the voltage corresponding to the levels of the detecting signals are output to the temperature display unit 25 to display the temperatures.

The functions of the liquid level gauge 4 as composed above are described hereinafter.

As shown in FIG. 1, the liquid level gauge 4 has the same functions as a usual liquid level gauge when the liquid level gauge 4 is attached to the reservoir tank 2 and when the connector terminals 20a to 20d are connected with the battery 23, the indicating light 24, and the temperature display unit 25 via the connector casing. Namely, when the surface level 1a of the fluid 1 goes down from the position shown by the continuous line of FIG. 1 to the position shown by the two dashed line of FIG. 1, the float 12 goes down following the changes of the surface level 1a, and the reed switch 11 is energized by facing the magnet 13 of the float 12. The decrease of the fluid 1 is, therefore, displayed by turning on the indicating light 24 provided at the driver's console.

As the heat conducting member 15 projecting from the lower end of the casing 7 is dipped in the fluid 1, the heat of the fluid 1 is transferred to the heat sensitive resistance element 16 via the heat conducting member 15. Detecting signals from the heat sensitive resistance element 16 are input into the temperature detecting circuit 17, voltages corresponding to the levels of the detecting signals are output to the temperature display unit 25, and the temperature of the fluid 1 is displayed in the driver's cab. In this embodiment, the temperature of the fluid 1 is detected via the heat conducting member 15 provided at the lower end of the printed board 9, and the heat sensitive resistance element 16 is not directly dipped in the fluid 1, so that a long-term endurance of the heat sensitive resistance element 16 can be achieved by protecting the heat sensitive resistance element 16 against the fluid 1.

As described above, the liquid level gauge 4 of the present embodiment has both the functions of detecting the changes of the surface level 1a of the fluid 1 and detecting the temperature of the fluid 1. In addition, the casing 7 making up the liquid level gauge 4 has the heat sensitive resistance element 16 attached thereto for detecting the temperature of the fluid 1. Therefore, the casing 7 of the liquid level gauge 4 can be also used as a casing for detecting the temperature of the fluid 1. The elements such as the printed board 9, each connector connecting terminal 20a to 20d of the liquid level gauge 4 can be also used as elements for detecting the temperature of the fluid 1.

Consequently, in the present embodiment, the number of elements can be reduced compared with devices having a liquid level gauge and a liquid thermometer separately. In the liquid level gauge 4 of the present embodiment, only the heat conducting member 15 is projected from the lower end of the casing 7 in order to detect the temperature at the fluid 1, and the size of the liquid level gauge 4 is not substantially enlarged compared with prior art liquid level gauges which only detect the changes of the surface level. The compact liquid level gauge 4 which has the temperature detecting function can, thus, be provided.

Only a single gauge mounting portion 3 for mounting the liquid level gauge 4 is required to be formed on the reservoir tank 2 in the present embodiment unlike the related art which has to have two gauge mounting portions on the reservoir tank 2 for mounting a liquid level gauge and a liquid thermometer respectively because the liquid level gauge 4 of the present embodiment has also the function of detecting the temperature of the fluid 1. Therefore, the assembly procedure, as well as the number of parts, required for the assembly, may be reduced. In addition, only one mounting portion 3 is required on reservoir tank 2.

The assembling and inspection of the reservoir tank 2 can also be simplified because the shape of the reservoir tank 2 can be made simpler than a tank which has two mounting portions.

The first embodiment of the present invention can be modified as described below.

(1) In the aforementioned embodiment, the heat conducting member 15 made of conductive foil is formed at the lower end of the printed board 9, and the heat sensitive resistance element 16 is connected to the heat conducting member 15. As shown in FIG. 4, however, it can be modified such that a heat conducting plate 26 made of aluminum can be fixed at the lower end of the printed board 9 by a rivet 26a, and that the heat sensitive resistance element 16 can be connected with the heat conducting plate 26. As shown in FIG. 5, a heat conducting segment 27 made of aluminum can be fixed at the lower end of the printed board 9, and the heat sensitive resistance element 16 can be connected with the heat conducting segment 27.

(2) In the aforementioned embodiment, the heat conducting member 15 is made of conducting foil is formed at the lower end of the printed board 9 and a part of the heat conducting member 15 is projected downward from the through hole 14a of the float stopper 14, and the heat sensitive resistance element 16 is connected with the heat conducting member 15 in the mounting hole 8 of the casing 7. In a modified example as shown in FIG. 6, the lower end of the printed board 9 is projected downward from the through hole 14a of the float stopper 14. A heat conudcting block 28 is caulked; on the projected end of the printed board 9.

The heat conducting block 28 is made of aluminum and is of a circular truncated cone shape (frustoconical). The heat sensitive resistance element 16 is connected with the heat conducting block 28 in the mounting hole 8 of the casing 7.

(3) In the aforementioned embodiment, the heat conducting member 15 made of conductive foil is formed on the lower end of the printed board 9, and the heat sensitive resistance element 16 is connected with the heat conducting member 15. In a modified example as shown in FIG. 7, without projecting the lower end of the printed board 9 downward from the casing 7, a float stopper 29 of cap shape made of a material which has a good heat conductivity and which is not magnetic is fitted to the lower end of the casing 7. The heat sensitive resistance element 16 is connected with the float stopper 29 in the mounting hole 8 of the casing 7.

(4) In the aforementioned embodiment, the heat sensitive resistance element 16 is used. The heat sensitive resistance element 16 may be, however, replaced by a platinum resistance, a thermistor, a diode, and so on. A heat sensible reed switch which only turns on and off at a predetermined temperature, can also be used to accomplish the required temperature measurement. Either a heat sensitive ferrite or a ferrite magnet and any one among a reed switch, a Hall element and a magnet resistance element are used as the heat sensitive reed switch.

(5) In the aforementioned embodiment, the liquid level gauge 4 is used at the reservoir tank 2 of the power steering fluid 1 of an automobile, but the liquid level gauge 4 of the present embodiment can also be used at a reservoir tank of brake fluid or at a fuel tank. Moreover, the liquid level gauge 4 of the present embodiment can be used at a water tank or at a drug tank etc. besides the tanks of an automobile.

(6) In the aforementioned embodiment, the printed board 9 having the connecting portion 9b projecting the connector connecting terminals 20a to 20d is used, but lead wires, instead, can be attached to the printed board 9, and connecting terminals can be formed at the tip portions of the lead wires.

(7) In the aforementioned embodiment, the circuit portion 19 for detecting a temperature is positioned in the casing 7, but the circuit portion 19 can be located separately from the casing 7.

(8) In the aforementioned embodiment, only the indicating light 24 is connected with the liquid level gauge 4 as a load for detecting the changes of the surface level, but a parallel load of the indicating light 24 and a buzzer can be connected with the liquid level gauge 4.

(9) In the aforementioned embodiment, only the temperature display unit 25 is connected with the liquid level gauge 4 as a load for detecting a temperature, but other units which have to be controlled in accordance with the other fluid temperatures can be connected with the liquid level gauge 4 if necessary.

(10) In the aforementioned embodiment, the liquid level gauge 4 is attached at the upper portion of the reservoir tank 2 and extending downward therefrom, but the liquid level gauge 4 can also be attached at the lower portion of the reservoir tank 2 and extending upward therefrom.

(11) In a modified example as shown in FIG. 8, a casing 47 is made of synthetic resin and is integrally formed in a reservoir tank 42. A heat conducting member 35 having good heat conductivity by means of mixing metallic powder into the synthetic resin is formed at the lower portion of the casing 47. The heat conducting member 35 is inserted to be integrally formed with the casing 47 at molding of the casing 47 in a molding die (not shown), and is formed as to surround the heat sensible resistance element 16. On the outer surface of the float 12 are provided a wave stopper cylinder 30 for restricting the vertical movement of the float 12 corresponding to the waving of the surface level 1a and a wave stopper lower member 31. The wave stopper cylinder 30 and the wave stopper lower member 31 are hooked by a stopper ring 32.

[Second Embodiment]

Figure 9:
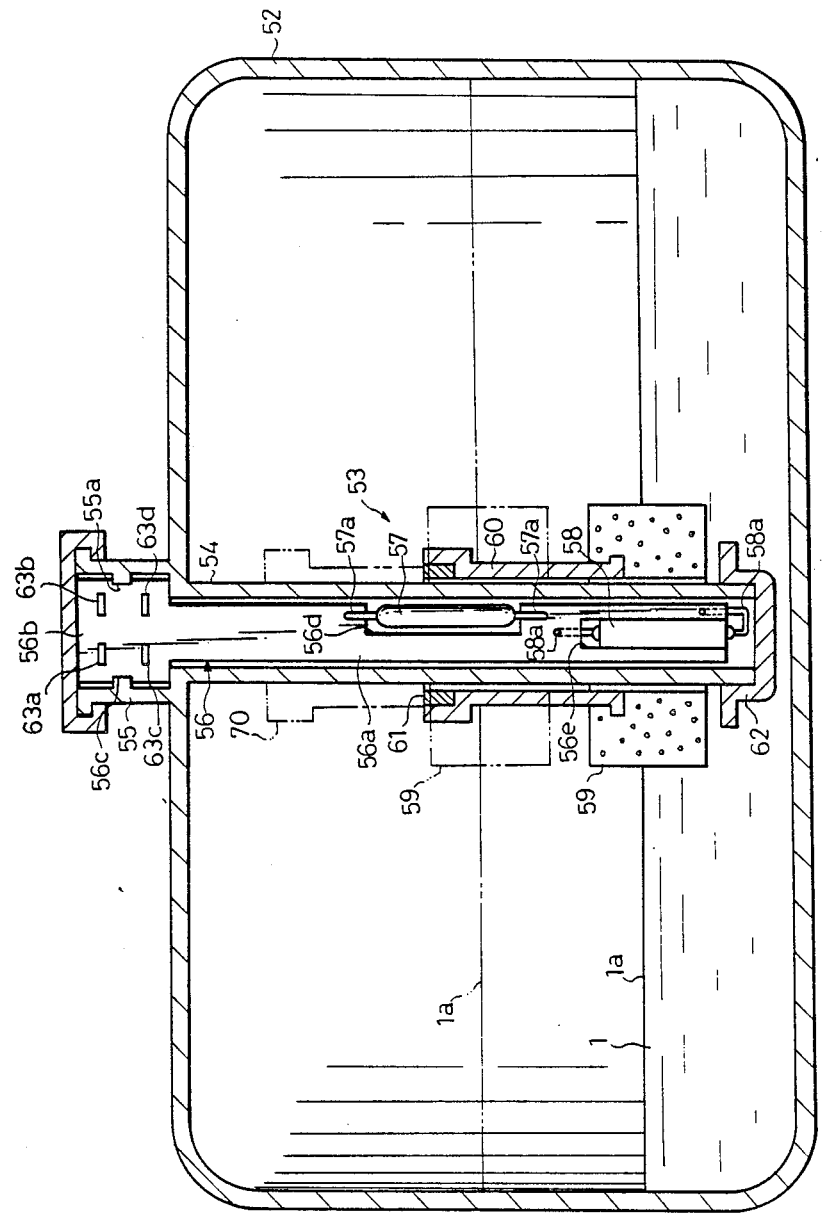
FIGS. 9 and 10 show the second embodiment of the present invention.

The second embodiment of the present invention, where a liquid level gauge is attached to a reservoir tank of a power steering fluid of an automobile, is described hereinafter, referring to the FIGS. 9 and 10. As shown in FIG. 9, a cylindrical casing 54 of a liquid level gauge 53 is integrally formed on an upper wall of a reservoir tank 52 and protruding downward. A mounting portion 55 having a larger diameter than that of the casing 54 is formed around an upper opening of the casing 54 protruding upward.

A printed board 56 made of glass epoxy of low water absorptivity is provided in the casing 54. The printed board 56 comprises a detecting portion 56a for detecting the changes of the surface level 1a of the fluid 1 and the temperature of the fluid 1, and a connecting portion 56b integrally formed on an upper portion of the detecting portion 56a and provided in the mounting portion 55. The printed board 56 is fixed at a predetermined position in the casing 54 by means of connecting an engaging concave 56c formed at the connecting portion 56b with an engaging projection 55a formed on the inner surface of the mounting portion 55.

A longitudinal notch 56d is formed on a periphery, in the width direction, of an upper portion of the detecting portion 56a. A reed switch 57 for detecting the changes of the surface level 1a is provided in the notch 56d in the same manner as in the first embodiment.

A longitudinal notch 56e is formed at a lower portion of the detecting portion 56a. A temperature sensitive reed switch 58 is provided in the notch 56e as a temperature detecting sensor having a normally open contact point. The temperature detecting reed switch 58 comprises either a temperature sensitive ferrite or a ferrite magnet and any one among a reed switch, a Hall element, and a magnet resistance element. Terminals 58a of upper and lower ends of the temperature sensitive reed switch 58 are bent to the opposite side of terminals 57a of the reed switch 57, namely, to the front side, and go through the printed board 56 near the upper and lower portions of the notch 56e to be fixed on the opposite side, namely, the front side of the printed board 56 by soldering. The detecting portion of the reed switch 57 and the detecting portion of temperature sensitive reed switch 58 are provided in parallel positions in the vertical direction to avoid magnetic interference with each other because both the reed switch 57 and the temperature sensitive reed switch 58 turn on and off corresponding to changes in magnetism.

A float 59 of ring shape is vertically movably attached around the outside of the casing 54. A supporting member 60 extending upward from the float 59 is fixed on the float 59. A magnet 61 for energizing the reed switch 57 is fixed at the upper portion of the inside of the supporting member 60.

The supporting member 60 is formed having a length where the magnet 61 is faced with the reed switch 57 when the surface level 1a of the fluid 1 goes down to the position shown by a continuous line in FIG. 9. A float stopper 62 is fitted on the lower end of the casing 54 in the same manner as in the first embodiment. The float stopper 62, however, does not have a through hole and seals the lower end opening of the casing 54. The float stopper 62 is preferred to be metallic in order to easily transfer the heat of the fluid 1 to the inside of the casing 54, but can be of synthetic resin.

Figure 10:
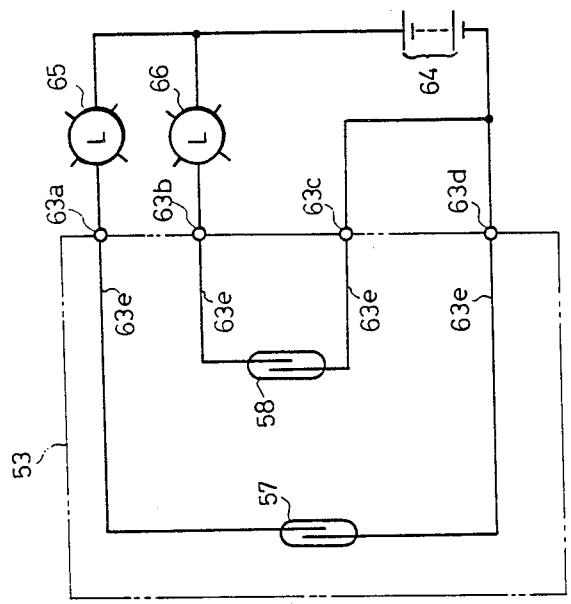

Four pieces of protruding connector connecting terminals 63a to 63d are provided on the connecting portion 56b, and each connector connecting terminal 63a to 63d is electrically connected with the upper and lower terminals 57a and 58a of both the reed switch 57 and the temperature sensitive reed switch 58 respectively via a printed wiring 63e formed on the printed board 56, as shown in FIG. 10. A connector casing (not shown) which has other connecting terminals corresponding to each connector connecting terminal 63a to 63d is attached to the mounting portion 55 to connect a power supply line and a signal output line with each connector connecting terminal 63a to 63d.

The electrical structure of the liquid level gauge 53 is described hereinafter referring to FIG. 10. Both ends of the reed switch 57 are respectively connected with the connector connecting terminals 63a and 63d. A negative electrode of a battery 64 is connected with one connector connecting terminal 63d, and a positive electrode of the battery 64 is connected with another connector connecting terminal 63a via an indicating light 65 provided in a driver's console. Accordingly, the indicating light 65 turns on when the reed switch 57 is energized. Both ends of the temperature sensitive reed switch 58 constituting the temperature detecting portion are respectively connected with the connector connecting terminals 63b and 63c. The negative electrode of the battery 64 are connected with one connector connecting terminal 63c, the positive electrode of the battery 64 is connected with another connector connecting terminal 63b via an alarm light 66 provided in the driver's console. Accordingly, the alarm light 66 turns on when the temperature sensitive reed switch 58 is energized.

The functions of the aforementioned liquid level gauge 53 are described hereinafter. The float 59 goes down in accordance with the changes of the surface level 1a when the surface level 1a of the fluid 1 in the reservoir tank 52 reduces down to the alarm level shown by a continuous line from a position shown by a two-dashed chain line in FIG. 9. In accordance with the downward movement of the float 59, the reed switch 57 is energized to turn on when the magnet 61 gets to a position where it faces the reed switch 57. The indicating light 65 provided in the driver's console then turns on to indicate the lowering of the surface level, namely, the reduction of the fluid 1. Then a level to be detected of the surface level 1a is positioned below the position of the reed switch 57, and the float 59 moves lower than the reed switch 57. A predetermined level of the surface level 1a can, however, be detected because the magnet 61 is attached to the supporting member 60 extending upward from the float 59.

The portion where the temperature, sensitive reed switch 58 is provided of the casing 54 is always dipped in the fluid 1, and the temperature sensible reed switch 58 therefore constantly detects the temperature of the fluid 1. The alarm light 66 turns on to indicate an overheated condition of the fluid 1 when the temperature of the fluid 1 goes above a predetermined temperature and the temperature sensitive reed switch 58 is energized to turn on.

When the predetermined detecting level to turn on the indicating light 65 of the surface level 1a is to be changed above the continuous line position of FIG. 9, and in order to deal with the above change, the length of the supporting member 60 and the position of the float stopper 62 can easily be changed instead of changing the positions where the reed switch 57 and the temperature sensitive reed switch 58 are provided.

The liquid level gauge 53 of the second embodiment of the present invention has the same effects as the first embodiment of the present invention.

[Third Embodiment]

Figure 11:
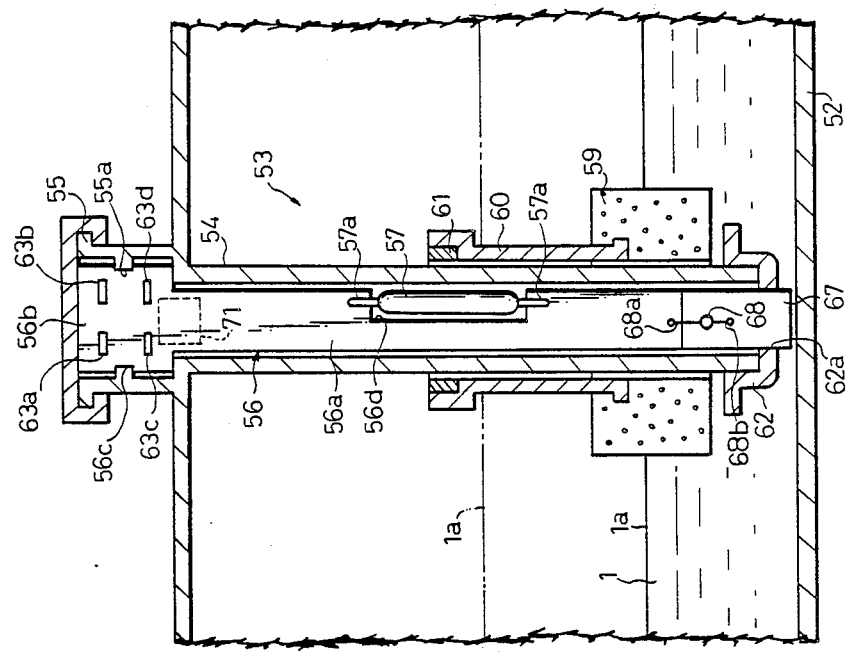
FIGS. 11 and 12 show the third embodiment of the present invention.
Figure 12:
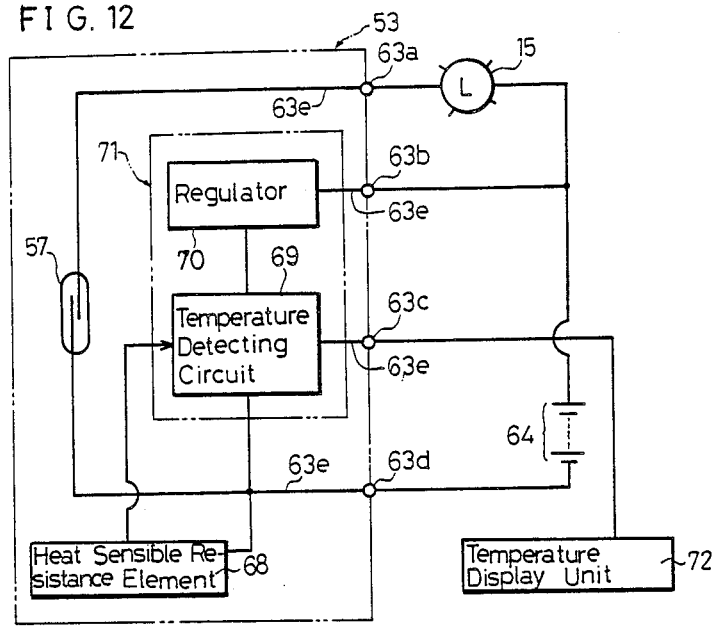
Figure 13:
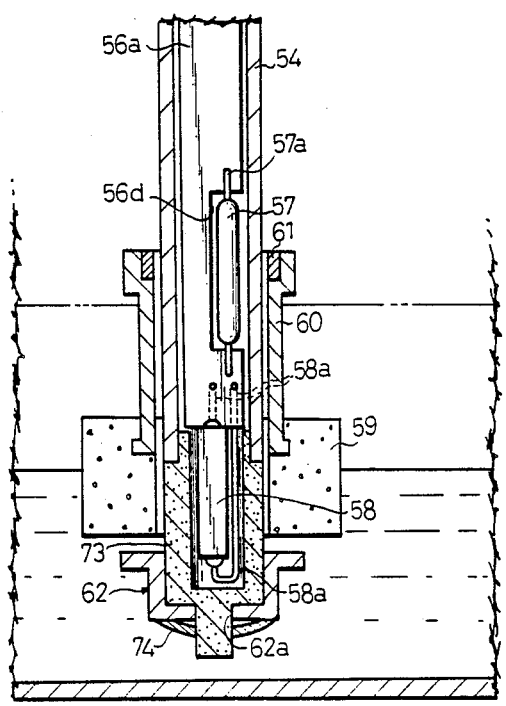
FIG. 13 is a partial broken view showing a different version of a temperature detecting portion.

The third embodiment of the present invention is described hereinafter referring to FIGS. 11 and 12. A liquid level gauge of the present embodiment uses the same type of heat sensitive resistance element as in the first embodiment and differs in this point from that of the second embodiment. A through hole 62a is formed at the bottom wall of a float stopper 62 as shown in FIG. 11. A heat conducting member 67 is formed at the lower end of the detecting portion 56a of the printed board 56, and the lower end of the heat conducting member 67 is dipped in the fluid 1. A heat sensitive resistance element 68 is provided at the upper end of the heat conducting member 17, and the heat of the fluid 1 is transferred to the heat sensitive resistance element 68 via the heat conducting member 67. An output terminal 68a of the heat sensitive resistance element 68 is connected with a circuit portion 71 provided at the upper portion of the detecting portion 56a, same as that of the first embodiment, which comprises a temperature detecting circuit 69, a regulator 70 and so on as shown in FIG. 12. Epoxy resin (not shown) is filled at the lower portion of the casing 54 in order to prevent the fluid 1 from coming into the casing 54 through the through hole 62a.

One end of the power terminal of the temperature detecting circuit 69 is connected with a connector connecting terminal 63b via the regulator 70 for voltage adjustment, and the other end of the power terminal of the temperature detecting circuit 69 is connected with a connector connecting terminal 63d as shown in FIG. 12. An output side of the temperature detecting circuit 69 is connected with a connector connecting terminal 63c. The temperature is displayed at a temperature display unit 72 as the detecting signal from the heat sensitive resistance element 68 is input into the temperature detecting circuit 69. Namely, the temperature of the fluid 1 is always displayed at the temperature display unit 72 in the apparatus of the present embodiment as well as in the first embodiment contrary to the second embodiment in which the alarm light 66 turns on when the temperature of the fluid 1 exceeds the predetermined temperature.

Figure 14:
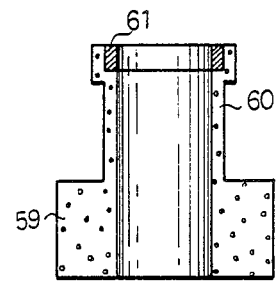
FIGS. 14 and 15 are sectional views showing different versions of a float and a supporting member.
Figure 15:
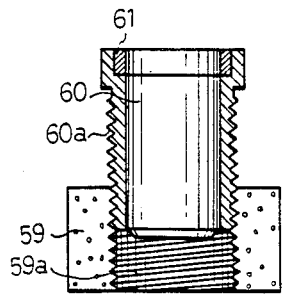

The second and third embodiments can be modified as below;

For instance, a heat conducting member 73 same as the modification shown in FIG. 8 is integrally formed at the lower end of the casing 54 surrounding the temperature sensing reed switch 58. A float stopper 62 is hooked by a stop ring 74 at the lower end of the heat conducting member 73 in the state that a part of the heat conducting member 73 is protruded from the float stopper 62. Moreover, the float 59 and the supporting member 60 are integrally formed as shown in FIG. 14. Furthermore, an internal thread 59a is formed on the internal surface of the float 59, an external thread 60a is formed on the external surface of the support member 60, and the supporting member 60 is screwed into the float 59, so that the length of the portion, which is protruded from the upper surface of the float 59, of the supporting member 60 is adjustable by means of adjusting the amount of screwing. In addition, the casing 54 can be formed separately from the reservoir tank 52.

Although only a few embodiments of the present invention have been described herein, it should be apparent to those skilled in the art that the present invention may be embodied in many other specific forms without departing from the spirit or scope of the invention. Therefore, the present examples and embodiments are to be considered illustrative and not restrictive and the invention is not to be limited to the details given herein, but may be modified within the scope of the appended claims.

What is claimed is:

1. A liquid level gauge for detecting a surface level of a fluid disposed within a container, the liquid level gauge comprising:
   an elongated gauge casing carried by the container and extending into the fluid such that it crosses a surface of the fluid;
   a float slidably coupled to said elongated gauge casing and arranged to rise and fall with the surface level of the fluid;

a magnet mounted on said float such that it rises and falls with the float;

magnet detecting means for detecting a position of said magnet;

heat sensitive means, disposed in the casing, for detecting an amount of heat of the fluid;

heat conducting means for thermally coupling the fluid to said heat sensitive means, said heat conducting means having a heat conductivity higher than a heat conductivity of said elongated gauge casing; and a detector support member disposed within said casing, wherein said heat sensitive means, said magnet detecting means, and at least a portion of said heat conducting means are attached to said detector support member.

2. A liquid level gauge according to claim 1 wherein said heat conducting means includes:
a first portion exposed outside of said casing and extending into the fluid; and
a second portion disposed within said casing and connected with said temperature detecting means.

3. A liquid level gauge according to claim 1 wherein:
said magnet detecting means and said heat sensitive means each include elongated sensing elements that are arranged in parallel and are vertically, spaced apart with the magnet detecting means being positioned above the heat sensitive means;
said float has a length at least as long as a vertical distance between said heat sensitive means and said magnet detecting means; and
said magnet is attached to the upper portion of said float.

4. A liquid level gauge according to claim 3 wherein said float has a larger diameter towards a bottom portion of the container and said magnet is attached to an upper portion of the float.

5. A liquid level gauge according to claim 3 wherein said elongated sensing elements are reed switches.

6. A liquid level gauge according to claim 1 wherein the detector support member is a printed board.

7. A liquid level gauge for detecting a surface level of a fluid disposed within a container, the liquid level gauge comprising:
an elongated gauge casing carried by the container and extending into the fluid such that it crosses a surface of the fluid;
a float slidably coupled to said elongated gauge casing and longitudinally movably engaged with the casing;
a magnet mounted on said float such that it rises and falls with the float;
magnet detecting means for detecting a position of said magnet;
heat sensitive means for detecting an amount of heat of the fluid;
heat conducting means for conducting heat, thermally connected with said heat sensitive means, said heat conducting means having a heat conductivity higher than a heat conductivity of said elongated gauge casing; and
a printed board provided in said casing, said magnetism detecting means and said heat sensitive means being attached to said printed board.

8. A liquid level gauge according to claim 7 wherein said heat conducting means is attached to the lower end of said casing and seals the lower end of said casing, and includes a float stopper that prevents said float from sliding off said casing.

9. A liquid level gauge according to claim 7 wherein said heat conducting means includes;
a heat conducting member made of synthetic resin mixed with metallic powder and integrally formed at the lower end of said casing.

10. A liquid level gauge according to claim 7 wherein said heat conducting means includes;
a conductive foil formed at the lower end of said printed board.

11. A liquid level gauge according to claim 7 wherein said heat conducting means includes;
a heat conducting plate mounted at the lower end of said printed board by a rivet.

12. A liquid level gauge according to claim 7 wherein said heat conducting means includes a heat conducting segment coupled to the lower end of said printed board.

13. A liquid level gauge according to claim 7 wherein:
the lower end of said printed board protrudes from the lower end of said casing; and
said heat conducting means includes a heat conducting block attached to the lower end of said printed board.

14. A liquid level gauge for detecting a surface level of a fluid disposed within a container, the liquid level gauge comprising:
an elongated gauge casing carried by the container and extending into the fluid such that it crosses a surface of the fluid;
a float slidably coupled to said elongated gauge casing and longitudinally movably engaged with the casing;
a magnet mounted on said float such that it rises and falls with the float;
magnet detecting means for detecting a position of said magnet;
temperature detecting means for detecting a temperature of the fluid;
heat conducting means for conducting heat, thermally connected with said temperature detecting means, said heat conducting means having a heat conductivity higher than a heat conductivity of said elongated gauge casing; and
said magnet detecting means and said temperature detecting means each include elongated sensing elements that are arranged in parallel and are vertically spaced apart with the magnet detecting means being positioned above the temperature detecting means;
said float has a length at least as long as a vertical distance between said temperature detecting means and said magnet detecting means; and
said magnet is attached to the upper portion of said float;
and further comprising a magnet supporting member attached to the upper end of said float and wherein said magnet is attached to the upper end of said magnet supporting member.

15. A liquid level gauge according to claim 14 wherein said float and said magnet supporting member are formed integrally.

16. A liquid level gauge according to claim 14 wherein:
said float has an internal thread on an inner surface thereof;

said magnet supporting member has an external thread on an outer surface corresponding to said internal thread; and a length of said magnet supporting member protrudes from said float and is adjustable by adjusting the amount of screwing of said external thread to said internal thread.

17. A liquid level gauge according to claim 14 further comprising:

a printed board provided in said casing, wherein said magnet detecting means and said temperature detecting means are attached to said printed board.

18. A liquid level gauge according to claim 17 wherein said heat conducting means includes a conductive foil formed at the lower end of said printed board.

19. A liquid level gauge according to claim 17 wherein said heat conducting means includes a heat conducting member made of synthetic resin mixed with metallic powder and is integrally formed at the lower end of said casing.

20. A gauge for detecting a surface level and temperature of a fluid within a container, the gauge comprising:

an elongated gauge casing carried by the container and extending into the fluid such that it crosses the surface of the fluid;

a float slidably coupled to the casing and arranged to rise and fall with the surface level of the fluid;

a magnet mounted on said float such that it rises and falls with the float;

heat sensitive means for detecting an amount of heat of the fluid;

means for detecting the position of the magnet; and a printed board provided in said casing, said magnet detecting means and said heat sensitive means being attached to said printed board.

* * * * *